(12) United States Patent
Han et al.

(10) Patent No.: US 11,557,244 B2
(45) Date of Patent: Jan. 17, 2023

(54) DISPLAY DEVICE

(71) Applicant: SAMSUNG DISPLAY CO., LTD., Yongin-si (KR)

(72) Inventors: Ho Seok Han, Yongin-si (KR); Gyung Hyun Ko, Yongin-si (KR)

(73) Assignee: Samsung Display Co., Ltd., Yongin-si (KR)

(*) Notice: Subject to any disclaimer, the term of this patent is extended or adjusted under 35 U.S.C. 154(b) by 0 days.

(21) Appl. No.: 17/816,712

(22) Filed: Aug. 1, 2022

(65) Prior Publication Data
US 2022/0375389 A1 Nov. 24, 2022

Related U.S. Application Data

(62) Division of application No. 16/706,544, filed on Dec. 6, 2019, now Pat. No. 11,417,260.

(30) Foreign Application Priority Data

Jan. 25, 2019 (KR) .................. 10-2019-0010117

(51) Int. Cl.
*G09G 3/32* (2016.01)
*G09G 3/20* (2006.01)
*G06V 40/13* (2022.01)

(52) U.S. Cl.
CPC ........ *G09G 3/2018* (2013.01); *G06V 40/1318* (2022.01); *G09G 3/2003* (2013.01); *G09G 3/32* (2013.01); *G09G 2310/027* (2013.01); *G09G 2310/0297* (2013.01); *G09G 2330/028* (2013.01)

(58) Field of Classification Search
CPC ...... G09G 3/2018; G09G 3/2003; G09G 3/32; G09G 2310/027; G09G 2310/0297; G09G 2330/028; G06V 40/1318
See application file for complete search history.

(56) References Cited

U.S. PATENT DOCUMENTS

| 9,741,280 B2 | 8/2017 | Kong et al. |
| 2014/0347404 A1 | 11/2014 | Lee et al. |
| 2015/0379967 A1 | 12/2015 | Kim |
| 2017/0309219 A1 | 10/2017 | Kong et al. |
| 2018/0074627 A1 | 3/2018 | Kong et al. |
| 2018/0235098 A1 | 8/2018 | Byeon et al. |

(Continued)

FOREIGN PATENT DOCUMENTS

| CN | 108417149 A | 8/2018 |
| KR | 10-2018-0030376 A | 3/2018 |

(Continued)

Primary Examiner — Temesghen Ghebretinsae
Assistant Examiner — Karin Kiyabu
(74) Attorney, Agent, or Firm — Lewis Roca Rothgerber Christie LLP

(57) ABSTRACT

A display device includes: a first pixel coupled to a first data line; a second pixel coupled to a second data line; a first node to receive a first node voltage; a first grayscale voltage generator for generating first grayscale voltages; a second grayscale voltage generator for generating second grayscale voltages; and a data driver configured to apply, to the first data line, a first data signal generated based on one of the first grayscale voltages, and to apply, to the second data line, a second data signal generated based on one of the first node voltage, the first grayscale voltages, and the second grayscale voltages.

6 Claims, 9 Drawing Sheets

(56) References Cited

U.S. PATENT DOCUMENTS

| | | |
|---|---|---|
| 2019/0102597 A1 | 4/2019 | Lu et al. |
| 2019/0197944 A1 | 6/2019 | Kim et al. |
| 2020/0202790 A1 | 6/2020 | Rha et al. |

FOREIGN PATENT DOCUMENTS

| | | |
|---|---|---|
| KR | 10-2018-0089093 A | 8/2018 |
| KR | 10-2020-0081859 A | 7/2020 |

DISPLAY DEVICE

CROSS-REFERENCE TO RELATED APPLICATIONS

This application is a divisional of U.S. patent application Ser. No. 16/706,544, filed Dec. 6, 2019, which claims priority to and the benefit of Korean Patent Application No. 10-2019-0010117, filed Jan. 25, 2019, the entire content of both of which is incorporated herein by reference.

BACKGROUND

1. Field

The present disclosure generally relates to a display device.

2. Related Art

With the development of information technologies, the importance of a display device which is a connection medium between a user and information has increased. Accordingly, display devices such as liquid crystal display devices and organic light emitting display devices are increasingly used.

A display device may have a fingerprint sensor for user authentication. The fingerprint sensor may be an optical fingerprint sensor.

The display device irradiates light with a high luminance onto a fingerprint of a user using an irradiation light source, and the optical fingerprint sensor detects reflected light of the irradiated light, so that the shape of the fingerprint of the user can be detected.

The display device may use pixels as the irradiation light source. Therefore, it is necessary that pixels located in a fingerprint sensing area should locally emit light with a high luminance. However, a display device according to a related art includes a single grayscale voltage generator, and hence light with a high luminance may be unintentionally emitted when pixels located in a fingerprint non-sensing area display high gray levels.

SUMMARY

Embodiments provide a display device in which display of a fingerprint non-sensing area can be normally maintained even when pixels located in a fingerprint sensing area locally emit light with a high luminance.

According to an aspect of the present disclosure, there is provided a display device including: a first pixel coupled to a first data line; a second pixel coupled to a second data line; a first node to receive a first node voltage; a first grayscale voltage generator configured to generate first grayscale voltages; a second grayscale voltage generator configured to generate second grayscale voltages; and a data driver configured to apply, to the first data line, a first data signal generated based on one of the first grayscale voltages, and apply, to the second data line, a second data signal generated based on one of the first node voltage, the first grayscale voltages, and the second grayscale voltages.

The data driver may include a digital-to-analog converting unit. The digital-to-analog converting unit may include: a first digital-to-analog converter having an input terminal coupled to the first grayscale voltage generator and an output terminal coupled to the first data line; a multiplexer having input terminals coupled to the first node, the first grayscale voltage generator, and the second grayscale voltage generator; and a second digital-to-analog converter having an input terminal coupled to an output terminal of the multiplexer and an output terminal coupled to the second data line.

The first grayscale voltage generator may generate the first grayscale voltages by dividing the difference between a first high voltage applied to a first high voltage terminal and a first low voltage applied to a first low voltage terminal, and the second grayscale voltage generator may generate the second grayscale voltages by dividing the difference between a second high voltage applied to a second high voltage terminal and a second low voltage applied to a second low voltage terminal.

The first node may be coupled to the first low voltage terminal.

The first node may be further coupled to the second low voltage terminal.

The multiplexer may provide the first grayscale voltages to the second digital-to-analog converter during a first period, provide the first node voltage to the second digital-to-analog converter during a second period after the first period, and provide the second grayscale voltages to the second digital-to-analog converter during a third period after the second period. The first period, the second period, and the third period may be included in one image frame period.

The multiplexer may provide the first node voltage to the second digital-to-analog converter during a fourth period after the third period, and provide the first grayscale voltages to the second digital-to-analog converter during a fifth period after the fourth period. The first period, the second period, the third period, the fourth period, and the fifth period may be included in one image frame period.

The first grayscale voltage generator may include: a first color grayscale voltage generator configured to generate first color grayscale voltages for expressing a first color from among the first grayscale voltages; a second color grayscale voltage generator configured to generate second color grayscale voltages for expressing a second color different from the first color from among the first grayscale voltages; and a third color grayscale voltage generator configured to generate third color grayscale voltages for expressing a third color different from the first color and the second color from among the first grayscale voltages.

The second grayscale voltage generator may include: a fourth color grayscale voltage generator configured to generate fourth color grayscale voltages for expressing a fourth color from among the second grayscale voltages; and a fifth color grayscale generator configured to generate fifth color grayscale voltages for expressing a fifth color different from the fourth color from among the second grayscale voltages.

Each of the fourth color and the fifth color may correspond to one of the first color, the second color, and the third color.

The first pixel may be located in a fingerprint non-sensing area in a display area, and the second pixel may be located in a fingerprint sensing area in the display area.

According to another aspect of the present disclosure, there is provided a display device including: a first pixel coupled to a first data line, the first pixel being located in a fingerprint non-sensing area in a display area; a second pixel coupled to a second data line, the second pixel being located in a fingerprint sensing area in the display area; a first node to which a first node voltage is applied; a first grayscale voltage generator configured to generate first grayscale voltages; a second grayscale voltage generator configured to generate second grayscale voltages; and a data driver configured to apply, to the first data line, a first data signal generated based on one of the first node voltage, the first grayscale voltages, and the second grayscale voltages, and to apply, to the second data line, a second data signal generated based on one of the first node voltage, the first grayscale voltages, and the second grayscale voltages.

The data driver may include a digital-to-analog converting unit. The digital-to-analog converting unit may include: a first multiplexer having input terminals coupled to the first node, the first grayscale voltage generator, and the second grayscale voltage generator; a first digital-to-analog converter having an input terminal coupled to an output terminal of the first multiplexer and an output terminal coupled to the first data line; a second multiplexer having input terminals coupled to the first node, the first grayscale voltage generator, and the second grayscale voltage generator; and a second digital-to-analog converter having an input terminal coupled to an output terminal of the second multiplexer and an output terminal coupled to the second data line.

The first grayscale voltage generator may generate the first grayscale voltages by dividing the difference between a first high voltage applied to a first high voltage terminal and a first low voltage applied to a first low voltage terminal, and the second grayscale voltage generator may generate the second grayscale voltages by dividing the difference between a second high voltage applied to a second high voltage terminal and a second low voltage applied to a second low voltage terminal.

The first node may be coupled to the first low voltage terminal.

The first node may be further coupled to the second low voltage terminal.

The second multiplexer may provide the first grayscale voltages to the second digital-to-analog converter during a first period, provide the first node voltage to the second digital-to-analog converter during a second period after the first period, and provide the second grayscale voltages to the second digital-to-analog converter during a third period after the second period. The first period, the second period, and the third period may be included in one image frame period.

The second multiplexer may provide the first node voltage to the second digital-to-analog converter during a fourth period after the third period, and provide the first grayscale voltages to the second digital-to-analog converter during a fifth period after the fourth period. The first period, the second period, the third period, the fourth period, and the fifth period are part of the image frame period.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

DETAILED DESCRIPTION

Figure 1:
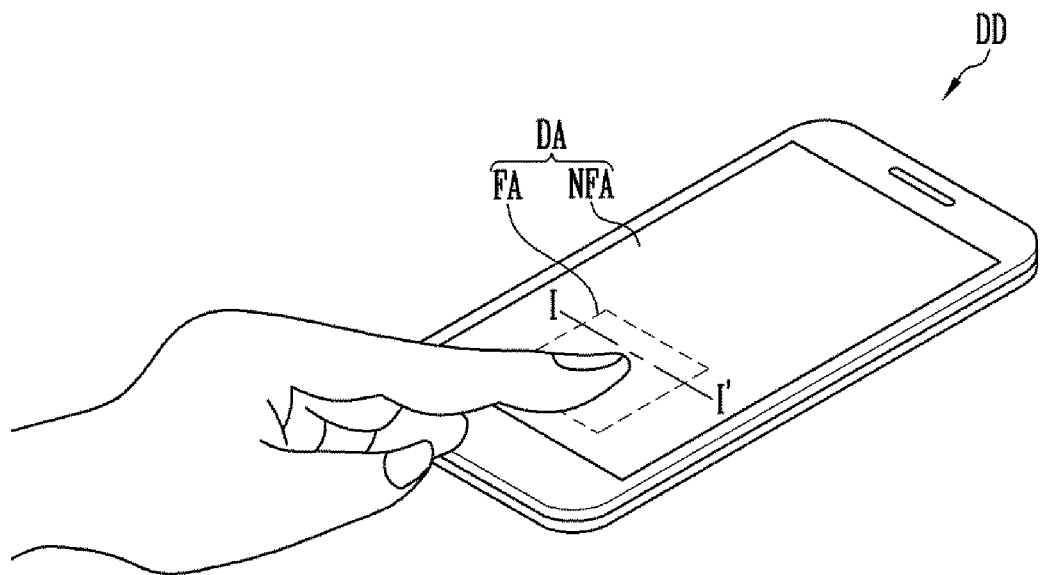
FIGS. 1 and 2 are views illustrating a display device according to an embodiment of the present disclosure.

Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof may not be repeated. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

The display and/or any other relevant devices or components according to embodiments of the present invention described herein may be implemented utilizing any suitable hardware, firmware (e.g., an application-specific integrated circuit), software, or a combination of software, firmware, and hardware. For example, the display device may include a plurality of pixels, a data driver, data lines, grayscale voltage generators, digital-to-analog converters, multiplexers, and other components. The various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

A part irrelevant to the description may be omitted to clearly describe the present disclosure, and the same or similar constituent elements may be designated by the same reference numerals throughout the specification. Therefore, the same reference numerals may be used in different drawings to identify the same or similar elements.

In addition, the size and thickness of each component illustrated in the drawings are arbitrarily shown for better understanding and ease of description, but the present disclosure is not limited thereto. Thicknesses of several portions and regions are exaggerated for clear expressions.

Figure 2:
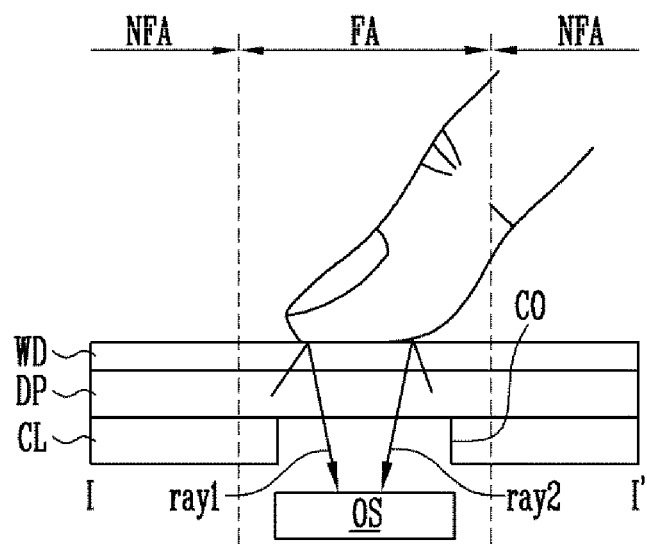

FIGS. 1 and 2 are views illustrating a display device according to an embodiment of the present disclosure.

Referring to FIG. 1, the display device DD according to the embodiment of the present disclosure may include a display area DA, and the display area DA may include a fingerprint sensing area FA and a fingerprint non-sensing area NFA.

FIG. 2 is a partial sectional view of the display device DD taken along the line I-I' shown in FIG. 1. Referring to FIG. 2, the display device DD may include a cushion CL, a display panel DP, and a window WD, which are stacked (e.g., sequentially stacked). Also, the display device DD may further include an optical fingerprint sensor OS.

The optical fingerprint sensor OS may include light receiving elements, and fingerprint information of a user may be extracted using lights incident on the light receiving elements.

The cushion CL is provided to reduce impact of the display panel DP, and may be made of an elastic material. When the cushion CL is made of an opaque material, the cushion CL may include an opening CO that exposes the optical fingerprint sensor OS.

The display panel DP allows pixels to emit light, based on information on an image frame provided by an external processor, thereby displaying the image frame. The display panel DP will be described in more detail with reference to FIG. 3.

The window WD covers the display panel DP, to protect the display panel DP from external impacts. The window WD may be made of a transparent material (glass, plastic or the like).

When the user places or positions a finger in the fingerprint sensing area FA, the display device DD may irradiate lights with a high luminance onto the fingerprint, using pixels located in the fingerprint sensing area FA as an irradiation light source, and fingerprint information of the user may be extracted using reflected lights ray1 and ray2 of the irradiated lights.

Figure 3:
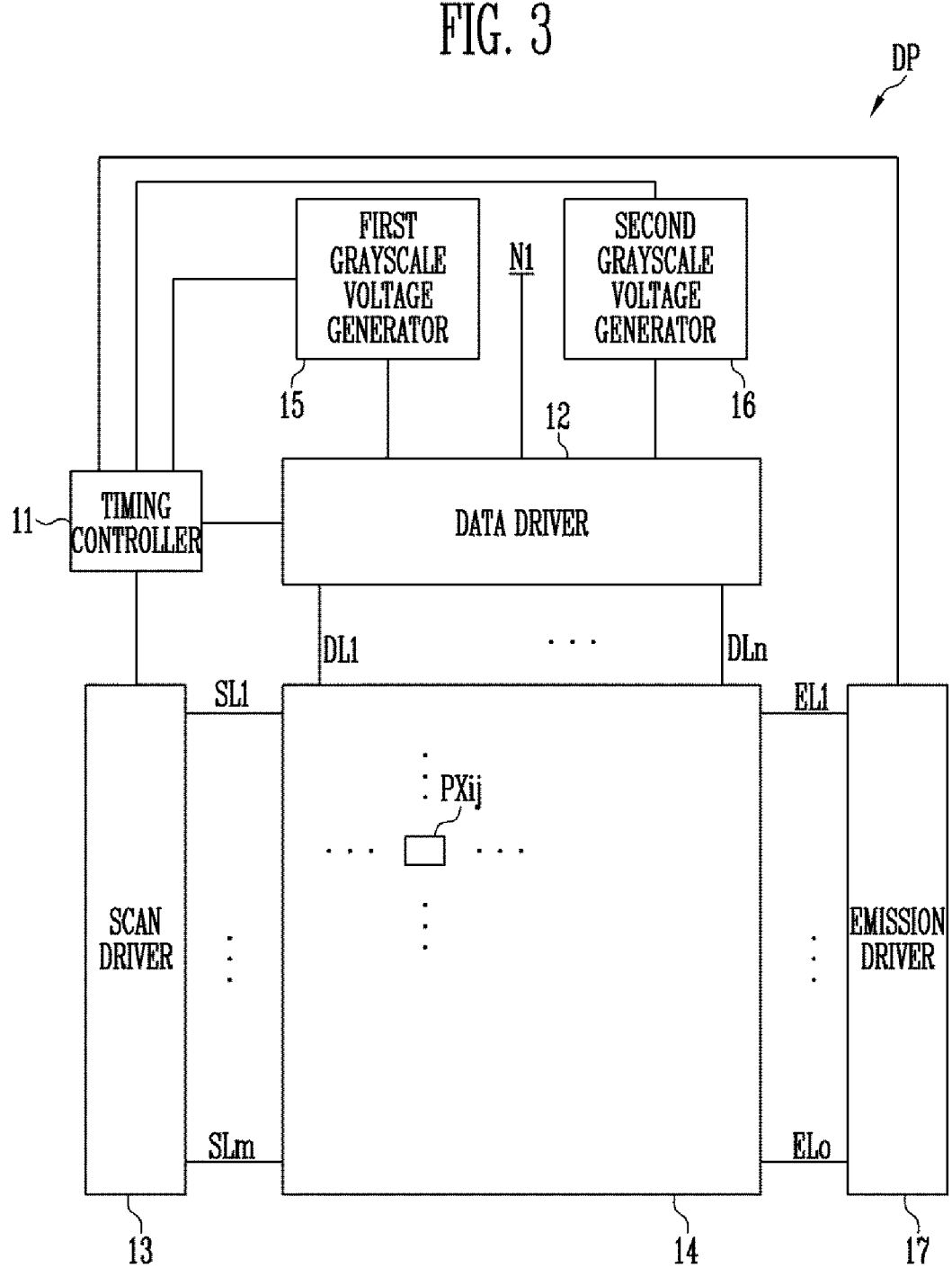
FIG. 3 is a diagram illustrating a display panel according to an embodiment of the present disclosure.

FIG. 3 is a diagram illustrating a display panel according to an embodiment of the present disclosure.

The display panel DP may include a timing controller 11, a data driver 12, a scan driver 13, a pixel unit 14, a first grayscale voltage generator 15, a second grayscale voltage generator 16, and an emission driver 17.

The timing controller 11 may receive grayscale values with respect to an image frame and control signals from an external processor. The timing controller 11 may convert the grayscale values and the control signals to be suitable for specifications of the data driver 12, and provide the converted grayscale values and control signals to the data driver 12. Also, the timing controller 11 may provide control signals to the scan driver 13 and the emission driver 17.

The data driver 12 may generate data signals to be provided to data lines DL1 to DLn, using the grayscale values and the control signals, which are received from the timing controller 11. In this example, n is an integer greater than 0. For example, the data driver 12 may apply the data signals to the data lines DL1 to DLn in units of pixel rows. Each of the data signals may correspond to one of first grayscale voltages provided from the first grayscale voltage generator 15, second grayscale voltages provided from the second grayscale voltage generator 16, and a first node voltage applied to a first node N1.

The scan driver 13 may generate scan signals to be provided to scan lines SL1 to SLm by receiving control signals such as a clock signal and a scan start signal from the timing controller 11. For example, the scan driver 13 may sequentially provide the scan signals having a turn-on level pulse to the scan lines SL1 to SLm. For example, the scan driver 13 may be configured in the form of a shift register, and generate the scan signals in a manner that sequentially transfers a turn-off level pulse of the scan start signal to a next stage circuit under the control of the clock signal. In this example, m is an integer greater than 0.

The emission driver 17 may generate emission signals to be provided to emission lines EL1 to ELo by receiving a clock signal, an emission stop signal, etc. from the timing controller 11. For example, the emission driver 17 may sequentially provide the emission signals having a turn-off level pulse to the emission lines EL1 to ELo. For example, the emission driver 17 may be configured in the form of a shift register, and generate the emission signals in a manner that sequentially transfers a turn-off level pulse of the emission stop signal to a next stage circuit under the control of the clock signal. In this example, o is an integer greater than 0.

The pixel unit 14 includes pixels PXij. Each pixel PXij may be coupled to a corresponding data line, a corresponding scan line, and a corresponding emission line. In this example, each of i and j may be an integer greater than 0. The pixel PXij may refer to a pixel having a scan transistor coupled to an ith scan line and a jth data line. In some embodiments, when the emission driver 17 is not provided in the display panel DP, the pixel unit 14 may not be coupled to the emission lines EL1 to ELo.

The pixel unit 14 may include pixels that emit light of multiple suitable colors as is well known to those skilled in the art. For example, the pixel unit 14 may include pixels that emit light of a first color, pixels that emit light of a second color, and pixels that emit light of a third color. The first color, the second color, and the third color may be colors different from one another. For example, the first color may be one color from red, green, and blue, the second color may be another color different the first color from among the red, the green, and the blue, and the third color may be the other color different from the first color and the second color from among the red, the green, and the blue. Instead of the red, the green, and the blue, magenta, cyan, and yellow may be used as the first to third colors. However, in this embodiment, a case where the red, the green, and the blue are used as the first to third colors is illustrated for convenience of description, and it is described that the magenta is expressed as a combination of the red and the blue, the cyan is expressed as a combination of the green and the blue, and the yellow is expressed as a combination of the red and the green. Although the use of pixels having three colors has been described, any suitable number of colors may be used. For example, in some embodiments four colors may be used.

Hereinafter, the position of each pixel PXij is described based on the position of a light emitting diode of the pixel PXij. That is, the position of a pixel circuit coupled to the light emitting diode of the pixel PXij may not correspond to that of the light emitting diode, and be appropriately disposed in the display panel DP so as to achieve space efficiency.

The first grayscale voltage generator 15 may generate first grayscale voltages. In some embodiments, magnitudes of the first grayscale voltages may be based on an input maximum luminance value. For example, a case having a total of 256 grayscale values includes values ranging from gray value 0 (minimum gray value) to grayscale 255 (maximum gray value) is illustrated for convenience of description. However, when a grayscale value is expressed with more than 8 bits, a larger number of grayscale values may be used (e.g., may exist). The minimum grayscale value may be a darkest grayscale value, and the maximum grayscale value may be a brightest grayscale value.

The maximum luminance value may be a luminance value of light emitted from pixels, corresponding to the maximum grayscale value. For example, the maximum luminance value may be a luminance value of white light when a pixel of the first color, which forms one dot, emits corresponding to the grayscale value 255, a pixel of the second color, which forms one dot, emits corresponding to the grayscale value 255, and a pixel of the third color, which forms one dot, emits corresponding to the grayscale value 255. The unit used to describe the luminance value may be a nit (e.g., candelas per square meter).

Therefore, the pixels PXij may display a partially (spatially) dark or bright image frame, but the maximum brightness of the image frame is limited to the maximum luminance value. The maximum luminance value may be manually set by manipulation of a user with respect to the display device DD, or be automatically set by an algorithm related to an illumination sensor, etc. The set maximum luminance value is expressed as an input maximum luminance value. The first grayscale voltage generator 15 may be configured to directly receive the input maximum luminance value from an external processor, or be configured to receive the input maximum luminance value through the timing controller 11.

The maximum luminance value may be changed depending on products. However, for example, the maximum value of the maximum luminance value may be 1200 nits, and the minimum value of the maximum luminance value may be 4 nits. When the input maximum luminance value is changed even though grayscale values are the same, the first grayscale voltage generator 15 provides different first grayscale voltages, and therefore, the emission luminance of each pixel is changed.

The second grayscale voltage generator 16 may generate second grayscale voltages. In some embodiments, magnitudes of the second grayscale voltages may be based on an input maximum luminance value. The second grayscale voltage generator 16 may be configured similarly to the first grayscale voltage generator 15, and therefore, overlapping descriptions may be omitted.

The first grayscale voltages generated by the first grayscale voltage generator 15 may be used to display an image frame. The second grayscale voltages generated by the second grayscale voltage generator 16 may be used to generate irradiation lights for fingerprint detection.

For example, with respect to the same grayscale value, an emission luminance of the pixel PXij, which is caused by the second grayscale voltage, may be higher than that of the pixel PXij, which is caused by the first grayscale voltage.

A first node voltage may be applied to the first node N1. The first node voltage will be described later with reference to FIG. 9.

Figure 4:
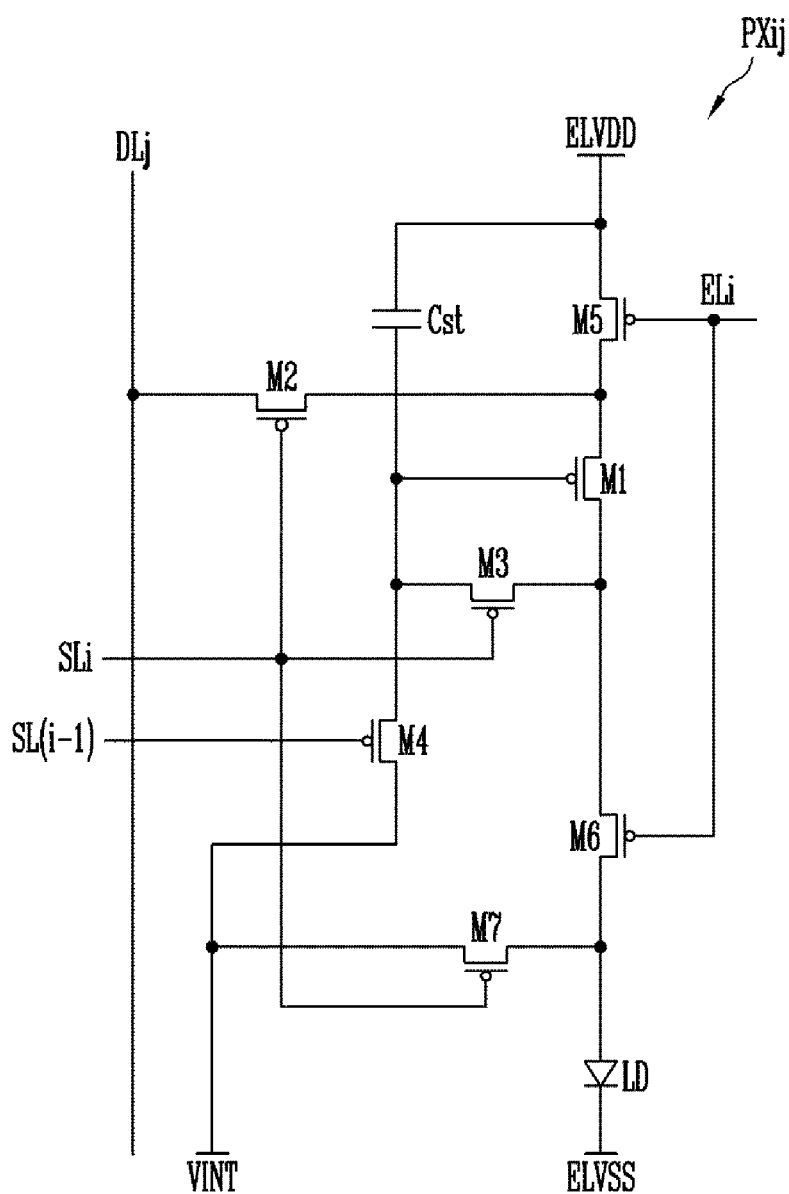
FIGS. 4 and 5 are diagrams illustrating a pixel according to an embodiment of the present disclosure.
Figure 5:
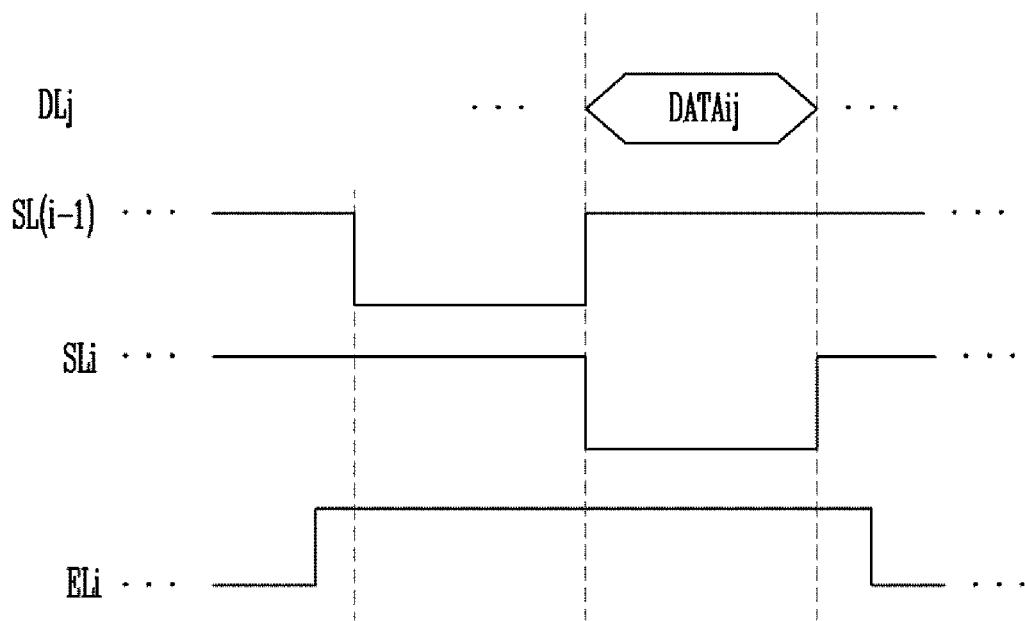
Figure 6:
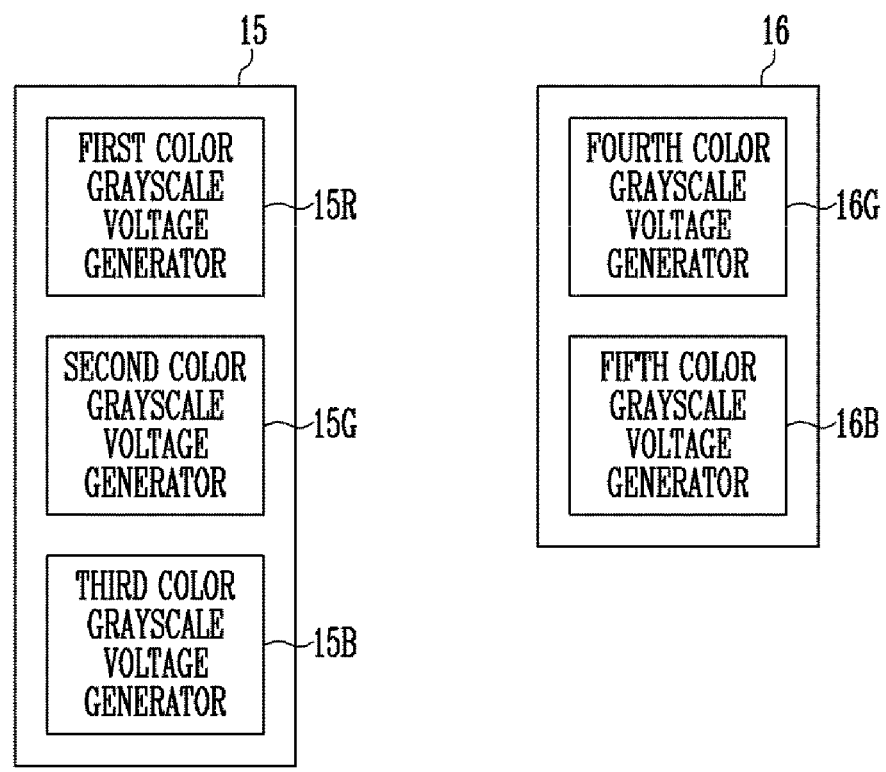
FIGS. 6-9 are diagrams illustrating a first grayscale voltage generator and a second grayscale voltage generator according to an embodiment of the present disclosure.

FIGS. 4 and 5 are diagrams illustrating a pixel according to an embodiment of the present disclosure.

Referring to FIG. 4, the pixel PXij may include transistors M1, M2, M3, M4, M5, M6, and M7, a storage capacitor Cst, and a light emitting diode LD.

In this embodiment, each of the transistors M1 to M7 is illustrated as a P-type transistor, e.g., a PMOS transistor. However, those skilled in the art may implement a pixel circuit that performs the same function, using an N-type transistor, e.g., an NMOS transistor.

A first electrode of the storage capacitor Cst is coupled to a first power line ELVDD, and a second electrode of the storage capacitor Cst is coupled to a gate electrode of the transistor M1.

A first electrode of the transistor M1 is coupled to a second electrode of the transistor M5, a second electrode of the transistor M1 is coupled to a first electrode of the transistor M6, and the gate electrode of the transistor M1 is coupled to second electrode of the storage capacitor Cst. The transistor M1 may be referred to as a driving transistor. The transistor M1 is used to control an amount of driving current flowing between the first power line ELVDD and a second power line ELVSS according to a potential difference between gate and source electrodes thereof.

A first electrode of the transistor M2 is coupled to a data line DLj, a second electrode of the transistor M2 is coupled to the first electrode of the transistor M1, and a gate electrode of the transistor M2 is coupled to a current scan line SLi. The transistor M2 may be referred to as a scan transistor, a switching transistor or the like. The transistor M2 allows a data voltage of the data line DLj to be input to the pixel PXij when a turn-on level scan signal is applied to the current scan line SLi.

A first electrode of the transistor M3 is coupled to the second electrode of the transistor M1, a second electrode of the transistor M3 is coupled to the gate electrode of the transistor M1, and a gate electrode of the transistor M3 is coupled to the current scan line SLi. The transistor M3 allows the transistor M1 to be coupled in a diode form when a turn-on level scan signal is applied to the current scan line SLi.

A first electrode of the transistor M4 is coupled to the gate electrode of the transistor M1, a second electrode of the transistor M4 is coupled to an initialization voltage line VINT, and a gate electrode of the transistor M4 is coupled to a previous scan line SL(i−1). In another embodiment, the gate electrode of the transistor M4 may be coupled to another scan line. The transistor M4 transfers an initialization voltage to the gate electrode of the transistor M1 when a turn-on level scan signal is applied to the previous scan line SL(i−1), to initialize a charge quantity of the gate electrode of the transistor M1.

A first electrode of the transistor M5 is coupled to the first power line ELVDD, a second electrode of the transistor M5 is coupled to the first electrode of the transistor M1 (and the second electrode of the transistor M2), and a gate electrode of the transistor M5 is coupled to an emission line ELi. The first electrode of the transistor M6 is coupled to the second electrode of the transistor M1, the second electrode of the transistor M6 is coupled to the first electrode of the light emitting diode LD, and a gate electrode of the transistor M6 is coupled to the emission line ELi. Each of the transistors M5 and M6 may be referred to as an emission transistor. The transistors M5 and M6 forms a driving current path between the first power line ELVDD and a second power line ELVSS when a turn-on level emission signal is applied, to allow the light emitting diode LD to emit light.

A first electrode of the transistor M7 is coupled to the first electrode of the light emitting diode LD, the second electrode of the transistor M7 is coupled to the initialization voltage line VINT, and a gate electrode of the transistor M7 is coupled to the current scan line SLi. In another embodiment, the gate electrode of the transistor M7 may be coupled to another scan line. For example, the gate electrode of the transistor M7 may be coupled to the previous scan line SL(i−1), a previous scan line before the previous scan line SL(i−1), a next scan line SL(i+1), or a next scan line after the (i+1)th scan line. The transistor M7 transfers the initialization voltage to the first electrode of the light emitting diode LD when a turn-on level scan signal is applied to the current scan line SLi, to initialize a charge quantity accumulated in the light emitting diode LD.

The first electrode of the light emitting diode LD may be coupled to the second electrode of the transistor M6 (and the second electrode of the transistor M7), and a second electrode of the light emitting diode LD may be coupled to the second power line ELVSS. The light emitting diode LD may be an element that emits light having a wavelength corresponding to a color (e.g., a specific color such as a first color, a second color, or a third color). The wavelength of the light emitted by the light emitting diode LD may rely on a bandgap of the light emitting diode LD.

The light emitting diode LD may correspond to an organic light emitting diode, an inorganic light emitting diode, a nano light emitting diode (nano LED), or any other suitable light emitting diode as would be understood by those skilled in the art.

FIG. 5 is a diagram illustrating an exemplary driving method of the pixel shown in FIG. 4.

First, a turn-on level (low level) scan signal is applied to the previous scan line SL(i−1). Because the transistor M4 is in a turn-on state, the initialization voltage is applied to the gate electrode of the transistor M1 such that the charge quantity of the gate electrode of the transistor M1 is initialized. Since a turn-off level (high level) emission signal is applied to the emission line ELi, the transistors M5 and M6 are in a turn-off state, and unnecessary emission of the light emitting diode LD due to the process of applying the initialization voltage is prevented.

Next, a data voltage DATAij with respect to a current pixel row is applied to the data line DLj, and a turn-on level scan signal is applied to the current scan line SLi. Accordingly, the transistors M2, M1, and M3 are in a conduction state, and the data line DLj and the gate electrode of the transistor M1 are electrically coupled to each other. Thus, the data voltage DATAij is applied to the other electrode of the storage capacitor Cst, and the storage capacitor Cst accumulates a charge quantity corresponding to the difference between the voltage of the first power line ELVDD and the data voltage DATAij.

Because the transistor M7 is in the turn-on state, the first electrode of the light emitting diode LD and the initialization voltage line VINT are electrically coupled to each other, and the light emitting diode LD is precharged or initialized to a charge quantity corresponding to the difference between the initialization voltage and the voltage of the second power line ELVSS.

Subsequently, when a turn-on level emission signal is applied to the emission line ELi, the transistors M5 and M6 are turned on, and the amount of driving current flowing through the transistor M1 is adjusted depending on a charge quantity accumulated in the storage capacitor Cst, so that the driving current flows through the light emitting diode LD. The light emitting diode LD emits light until a turn-off level emission signal is applied to the emission line ELi. The period in which the turn-on level emission signal is applied to the emission line ELi may be referred to as an emission period of the corresponding pixel.

FIGS. 6-9 are diagrams illustrating a first grayscale voltage generator and a second grayscale voltage generator according to an embodiment of the present disclosure.

Because first grayscale voltages generated by the first grayscale voltage generator 15 are used to display an image frame, the first grayscale voltage generator provides first grayscale voltages with respect to all three primary colors (i.e., red, green, and blue).

Therefore, the first grayscale voltage generator 15 may include a first color grayscale voltage generator 15R, a second color grayscale voltage generator 15G, and a third color grayscale voltage generator 15B.

The first color grayscale voltage generator 15R may generate first color grayscale voltages for expressing a first color among the first grayscale voltages. As described above, a case where the first color is red is used for convenience of description.

The second color grayscale voltage generator 15G may generate second color grayscale voltages for expressing a second color different from the first color among the first grayscale voltages. As described above, a case where the second color is green is used for convenience of description.

The third color grayscale voltage generator 15B may generate third color grayscale voltages for expressing a third color different from the first color and the second color among the first grayscale voltages. As described above, a case where the third color is blue is used for convenience of description.

Second grayscale voltages generated by the second grayscale voltage generator 16 may be used to generate irradiation light for fingerprint detection. High luminance of the irradiation light may be a desired factor for fingerprint detection, but the color of the irradiation light may not be a necessary factor for fingerprint detection. Hence, it is unnecessary to provide second grayscale voltages corresponding to all three of the primary colors.

Therefore, the second grayscale voltage generator 16 may include two color grayscale voltage generators (e.g., a fourth color grayscale voltage generator 16G and a fifth color grayscale voltage generator 16B).

The fourth grayscale voltage generator 16G may generate fourth color grayscale voltages for expressing a fourth color from among the second grayscale voltages.

The fifth grayscale voltage generator 16B may generate fifth color grayscale voltages for expressing a fifth color different from the fourth color from among the second grayscale voltages.

Each of the fourth color and the fifth color may correspond to one of the first color, the second color, and the third color. In an example, the fourth color may be the green, and the fifth color may be the blue. In another example, the fourth color may be the green, and the fifth color may be the red. In still another example, the fourth color may be the blue, and the fifth color may be the red.

According to this embodiment, because the second grayscale voltage generator 16 includes only two color grayscale voltage generators, the configuration cost of the second grayscale voltage generator 16 can be reduced as compared with the first grayscale voltage generator 15 which includes three color grayscale voltage generators.

According to another embodiment, the second grayscale voltage generator 16 may include only one color grayscale voltage generator. For example, the second grayscale voltage generator 16 may include only a green grayscale voltage generator. As is known by those skilled in the art, the green color more highly contributes to luminance as compared with the red and the blue colors. Therefore, when luminance necessary for fingerprint detection is to be sufficiently secured using green light, the second grayscale voltage generator 16 may be configured to include one color grayscale voltage generator.

Figure 7:
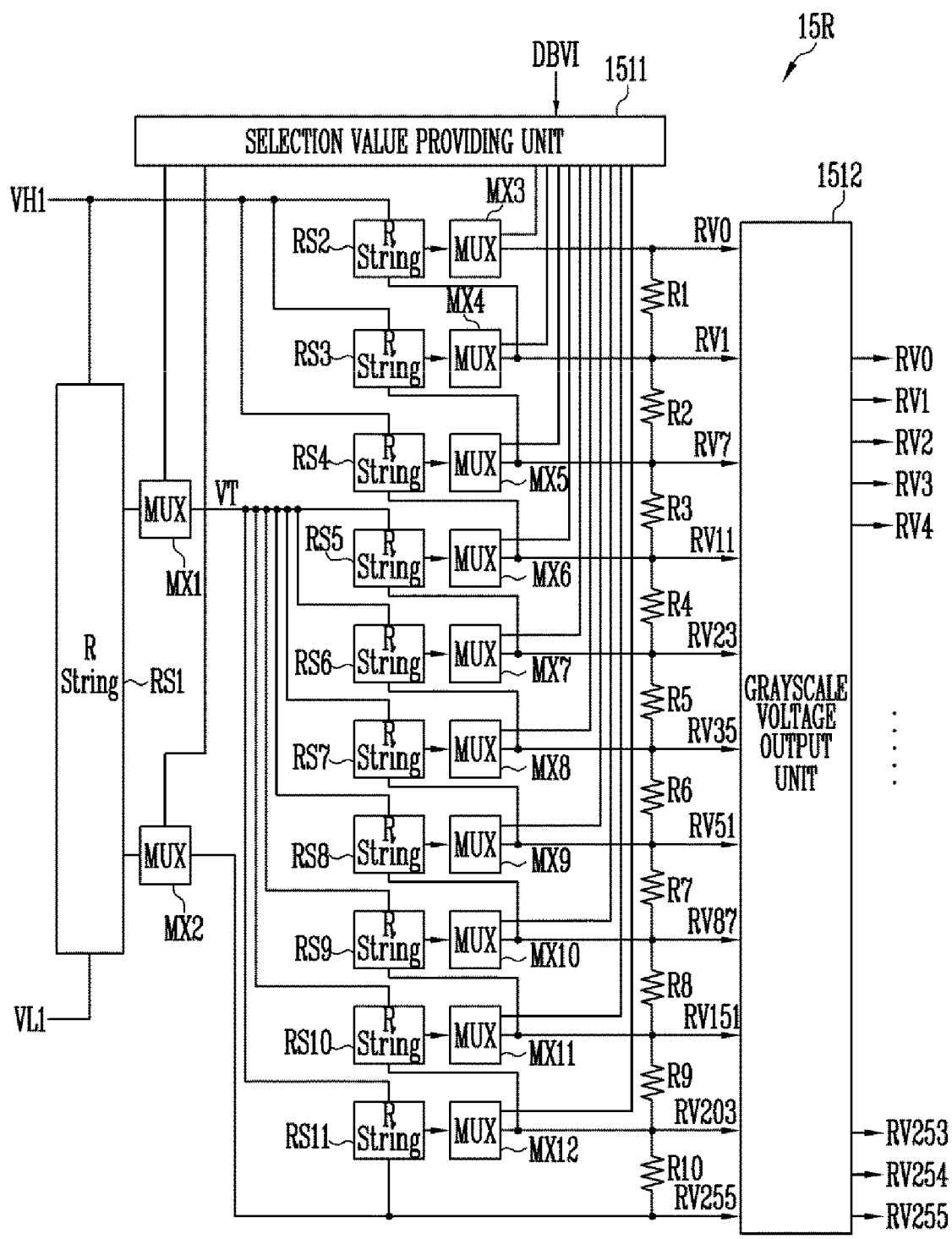

Referring to FIG. 7, the first color grayscale voltage generator 15R is exemplarily illustrated. The other color grayscale voltage generators 15G, 15B, 16G, and 16B may be configured to be substantially the same as (e.g. substantially identical) the first color grayscale voltage generator 15R, and therefore, their overlapping descriptions may be omitted. However, selection values stored in a selection value providing unit of each of the other color grayscale voltage generators 15G, 15B, 16G, and 16B may be different from those stored in a selection value providing unit 1511 of the first color grayscale voltage generator 15R.

The first color grayscale voltage generator 15R may include the selection value providing unit 1511, a grayscale voltage output unit 1512, resistor strings RS1 to RS11, multiplexers MX1 to MX12, and resistors R1 to R10.

The selection value providing unit 1511 may provide selection values with respect to the multiplexers MX1 to MX12 according to an input maximum luminance value DBV1. The selection values according to the input maximum luminance value DBV1 may be pre-stored in an element, e.g., a register or the like.

The resistor string RS1 may generate intermediate voltages between a first high voltage applied to a first high voltage terminal VH1 and a second low voltage applied to a first low voltage terminal VL1. The multiplexer MX1 may output a reference voltage VT by selecting one of the intermediate voltages provided from the resistor string RS1 according to a selection value. The multiplexer MX2 may output a 255 grayscale voltage RV255 by selecting one of the intermediate voltages provided from the resistor string RS1 according to a selection value.

The resistor string RS11 may generate intermediate voltages between the reference voltage VT and the 255 grayscale voltage RV255. The multiplexer MX12 may output a 203 grayscale value RV203 by selecting one of the intermediate voltages provided from the resistor string RS11 according to a selection value.

The resistor string RS10 may generate intermediate voltages between the reference voltage VT and the 203 grayscale voltage RV203. The multiplexer MX11 may output a 151 grayscale voltage RV151 by selecting one of the intermediate voltages provided from the resistor string RS10 according to a selection value.

The resistor string RS9 may generate intermediate voltages between the reference voltage VT and the 151 grayscale voltage RV151. The multiplexer MX10 may output an 87 grayscale voltage RV87 by selecting one of the intermediate voltages provided from the resistor string RS9 according to a selection value.

The resistor string RS8 may generate intermediate voltages between the reference voltage VT and the 87 grayscale voltage RV87. The multiplexer MX9 may output a 51 grayscale voltage RV51 by selecting one of the intermediate voltages provided from the resistor string RS8 according to a selection value.

The resistor string RS7 may generate intermediate voltages between the reference voltage VT and the 51 grayscale voltage RV51. The multiplexer MX8 may output a 35 grayscale voltage RV35 by selecting one of the intermediate voltages provided from the resistor string RS7 according to a selection value.

The resistor string RS6 may generate intermediate voltages between the reference voltage VT and the 35 grayscale voltage RV35. The multiplexer MX7 may output a 23 grayscale voltage RV23 by selecting one of the intermediate voltages provided from the resistor string RS6 according to a selection value.

The resistor string RS5 may generate intermediate voltages between the reference voltage VT and the 23 grayscale voltage RV23. The multiplexer MX6 may output an 11 grayscale voltage RV11 by selecting one of the intermediate voltages provided from the resistor string RS5 according to a selection value.

The resistor string RS4 may generate intermediate voltages between the first high voltage VH1 and the 11 grayscale voltage RV11. The multiplexer MX5 may output a 7 grayscale voltage RV7 by selecting one of the intermediate voltages provided from the resistor string RS4 according to a selection value.

The resistor string RS3 may generate intermediate voltages between the first high voltage VH1 and the 7 grayscale voltage RV7. The multiplexer MX4 may output a 1 grayscale voltage RV1 by selecting one of the intermediate voltages provided from the resistor string RS3 according to a selection value.

The resistor string RS2 may generate intermediate voltages between the first high voltage VH1 and the 1 grayscale voltage RV1. The multiplexer MX3 may output a 0 grayscale voltage RV0 by selecting one of the intermediate voltages provided from the resistor string RS2 according to a selection value.

The above-described grayscales values (e.g., gray levels) 0, 1, 7, 11, 23, 35, 51, 87, 151, 203, and 255 may be referred to as reference grayscales values. In addition, the grayscale voltages RV0, RV1, RV7, RV11, RV23, RV35, RV51, RV87, RV151, RV203, and RV255 generated from the multiplexers MX2 to MX12 may be referred to as reference grayscale voltages. A number of reference grayscale values and grayscale numbers corresponding to the reference grayscale values may be differently set depending on products. Hereinafter, a case where the grayscale values 0, 1, 7, 11, 23, 35, 51, 87, 151, 203, and 255 are reference grayscales values is illustrated for convenience of description.

The grayscale voltage output unit 1512 may generate first color grayscale voltages RV0 to RV255 by dividing the reference grayscale voltages RV0, RV1, RV7, RV11, RV23, RV35, RV51, RV87, RV151, RV203, and RV255. For example, the grayscale voltage output unit 1512 may generate first color grayscale voltages RV2 to RV6 by dividing the reference grayscale voltages RV1 and RV7.

Figure 8:
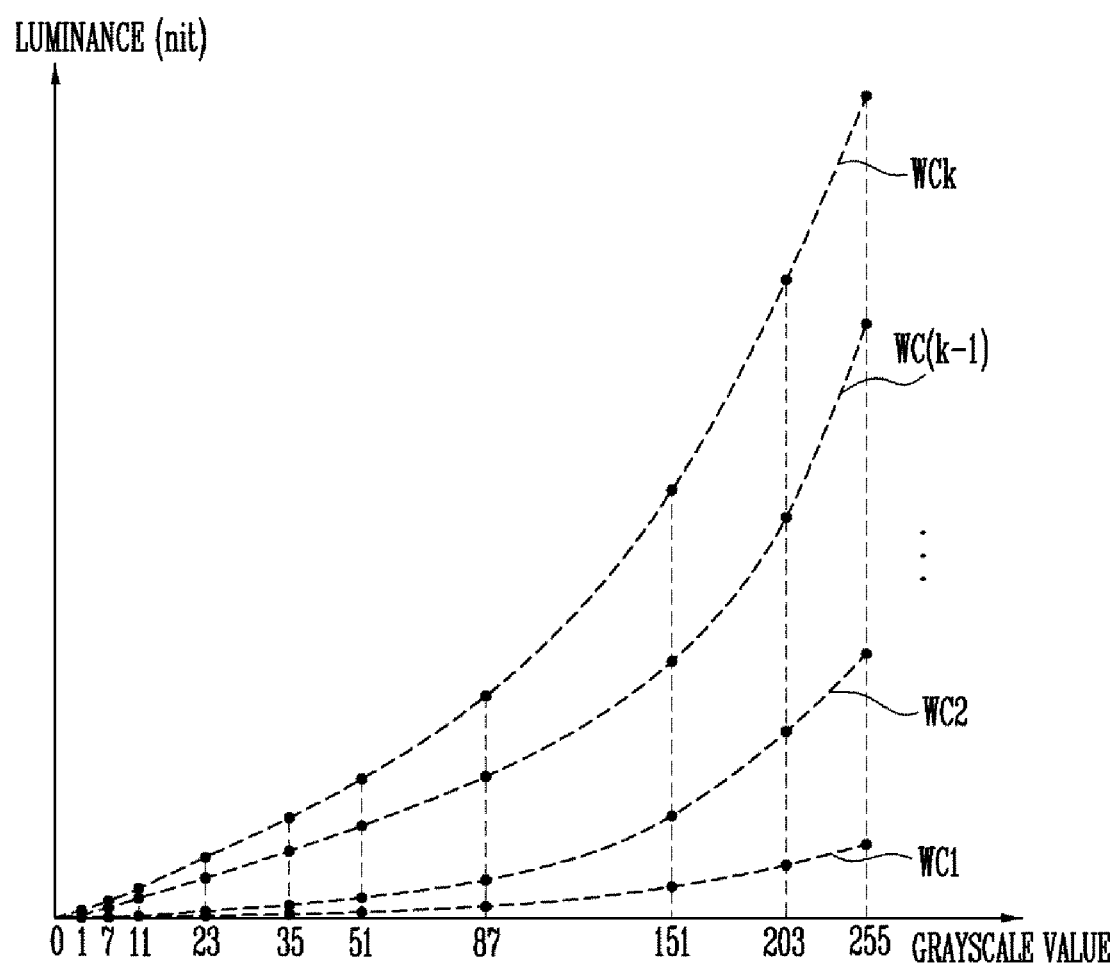

Referring to FIG. 8, white light curves WC1, WC2, WC(k−1), and WCk of output luminances with respect to grayscale values are illustrated. Here, k may be an integer larger than 0.

Maximum luminance values of the white light curves WC1 to WCk may be different from one another. For example, the maximum luminance value (e.g., 4 nits) of the white light curve WC1 may be the lowest, and the maximum luminance value (e.g., 1200 nits) of the white light curve WCk may be the highest.

In order to generate white light, a case where data voltages with respect to the same grayscale values are input the pixels PXij of all colors is assumed.

Imaginary dots shown on the white light curves WC1 to WCk shown in FIG. 8 may correspond to the selection values pre-stored in the selection value providing unit 1511. When the number of selection values is increased, more accurate white light curves may be directly expressed. However, physical elements such as multiplexers and registers, which correspond to the increased number of selection values, may further be required, and hence a practical limitation may exist. Therefore, selection values with respect to the above-described reference grayscale voltages may be pre-stored and used, and the other grayscale voltages may be generated by dividing the reference grayscale voltages. For the same reason, selection values with respect to some maximum luminance values (e.g., reference maximum luminance values) between 4 nits and 1200 nits may be pre-stored and used, and the other maximum luminance values may be generated by interpolating the selection values.

The pre-stored selection values may be set for every individual product, through Multi-time Programming (MTP). That is, in order to emit white light with a desired luminance with respect to grayscale values, selection values may be set through repeated measurement to be stored in a product.

According to an embodiment, although the same input maximum luminance value DBV1 is input to the first grayscale voltage generator 15 and the second grayscale voltage generator 16, a first white light curve corresponding to the first grayscale voltage generator 15 and a second white light curve corresponding to the second grayscale voltage generator 16 may be different from each other. For example, with respect to the same grayscale value, an emission luminance of a second pixel that emits light, based on a second grayscale voltage of the second grayscale voltage generator 16, may be higher than that of a first pixel that emits light, based on a first grayscale voltage of the first grayscale voltage generator 15. For example, when the first white light curve is WCx, the second white light curve may be WCy. Here, x may be an integer, and y may be an integer greater than x.

Figure 9:
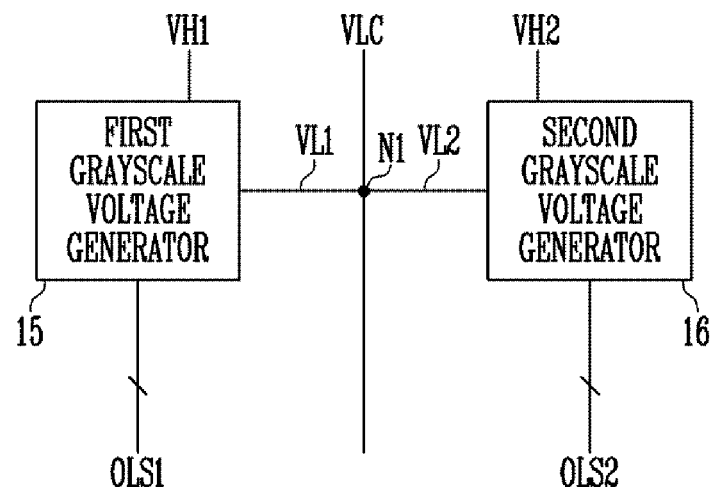

Referring to FIG. 9, a coupling configuration of the first grayscale voltage generator 15, the second grayscale voltage generator 16, and the first node N1 according to an embodiment is illustrated.

As described with reference to FIG. 7, the first grayscale voltage generator 15 may generate first grayscale voltages by dividing the difference between the first high voltage applied to the first high voltage terminal VH1 and the first low voltage applied to the first low voltage terminal VL1. The generated first grayscale voltages may be applied to output lines OLS1.

Similarly, the second grayscale voltage generator 16 may generate second grayscale voltages by dividing the difference between a second high voltage applied to a second high voltage terminal VH2 and a second low voltage applied to a second low voltage terminal VL2. The generated second grayscale voltages may be applied to output lines OLS2 of the second grayscale voltage generator 16.

According to an embodiment, a common low voltage terminal VLC may be provided. The first low voltage terminal VL1 and the second low voltage terminal VL2 may be coupled to the common low voltage terminal VLC. The first node N1 may be coupled to the first low voltage terminal VL1 and the second low voltage terminal VL2.

According to another embodiment, the common low voltage terminal VLC may not be provided. The first low voltage terminal VL1 and the second low voltage terminal VL2 may be separated from each other. The first node N1 may be coupled to only the first low voltage terminal VL1. Meanwhile, the first node N1 may be coupled to only the second low voltage terminal VL2.

According to each embodiment, a stable first node voltage may be maintained at the first node N1. For example, the first low voltage and the second low voltage are basic voltages for generating grayscale voltages. Unlike the grayscale voltages, the first low voltage and the second low voltage may be relatively stable voltages that are not changed depending on the input maximum luminance value DBV1.

Figure 10:
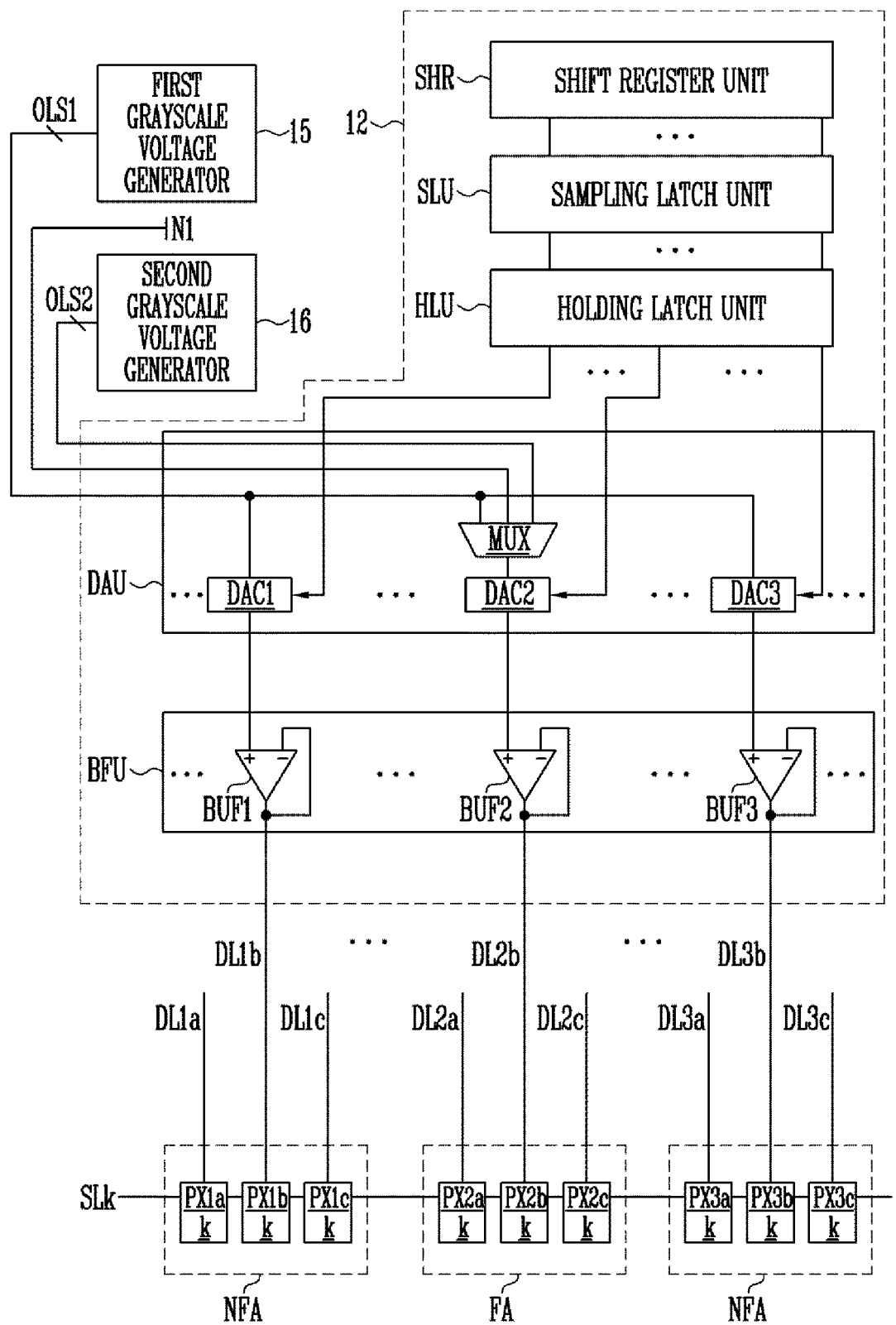
FIG. 10 is a diagram illustrating a data driver according to an embodiment of the present disclosure.

FIG. 10 is a diagram illustrating a data driver according to an embodiment of the present disclosure.

Referring to FIG. 10, the data driver 12 according to embodiments of the present disclosure may selectively include a shift register unit SHR, a sampling latch unit SLU, a holding latch unit HLU, a digital-to-analog converting unit DAU, and a buffer unit BFU.

The shift register unit SHR, the sampling latch unit SLU, the holding latch unit HLU, and the buffer unit BFU may be configured using the related art. Hereinafter, an exemplary configuration of the shift register unit SHR, the sampling latch unit SLU, the holding latch unit HLU, and the buffer unit BFU is illustrated.

The shift register unit SHR may be provided with a source start pulse and a source shift clock from the timing controller 11. The shift register unit SHR may sequentially generate sampling signals while shifting the source start pulse for every one period of the source shift clock. A number of sampling signals may correspond to a number of data lines (e.g., DL1a, DL1b, DL1c, DL2a, DL2b, DL2c, DL3a, DL3b, DL3c, . . . etc.). In an example, the number of the sampling signals may be equal to that of data lines DL1a to DL3c. In another example, when the display panel DP further includes a demultiplexer between the data driver 12 and the data lines DL1a to DL3c, the number of the sampling signals may be smaller than that of the data lines DL1a to DL3c. Hereinafter, a case where the number of the sampling signals is equal to that of the data lines DL1a to DL3c is described for convenience of description.

The sampling latch unit SLU may include sampling latches corresponding to the number of the data lines DL1a to DL3c, and be sequentially provided with grayscale values with respect to an image frame from the timing controller 11. The sampling latch unit SLU may store the grayscale values sequentially provided from the timing controller 11 in corresponding sampling latches, in response to the sampling signals sequentially supplied from the shift register unit SHR.

The holding latch unit HLU may include holding latches corresponding to the number of the data lines DL1a to DL3c. The holding latch unit HLU may store, in the holding latches, the grayscale values stored in the sampling latches when a source output enable signal is input from the timing controller 11.

The digital-to-analog converting unit DAU may include a plurality of digital-to-analog converters (e.g., DAC1, DAC2, and DAC3), and multiplexers (e.g., MUX). In this embodiment, a number of digital-to-analog converters DAC1 to DAC3 may correspond to that of the data lines DL1a to DL3c. For example, the number of the digital-to-analog converters DAC1 to DAC3 may be equal to that of the data lines DL1a to DL3c. However, a number of the multiplexers MUX may not correspond to that of the data lines DL1a to DL3c. For example, the number of the multiplexers MUX may be smaller than that of the digital-to-analog converters DAC1 to DAC3.

Input terminals of a first digital-to-analog converter DAC1 and a third digital-to-analog converter DAC3 may not be coupled to the multiplexer MUX. Coupling configurations of the first digital-to-analog converter DAC1 and the third digital-to-analog converter DAC3 are substantially the same. Hereinafter, the coupling configuration will be described based on the first digital-to-analog converter DAC1. The input terminal of the first digital-to-analog converter DAC1 may be coupled to the first grayscale voltage generator 15, and an output terminal of the first digital-to-analog converter DAC1 may be coupled to a first data line DL1b. For example, the output terminal of the first digital-to-analog converter DAC1 may be coupled to the first data line DL1b through a buffer BUF1. As will be described later, when the buffer unit BFU is omitted, the output terminal of the first digital-to-analog converter DAC1 may be directly coupled to the first data line DL1b.

In another example, an input end of a second digital-to-analog converter DAC2 may be coupled to the multiplexer MUX. An input terminal of the second digital-to-analog converter DAC2 may be coupled to an output terminal of the multiplexer MUX, and an output terminal of the second digital-to-analog converter DAC2 may be coupled to a second data line DL2b. For example, the output terminal of the second digital-to-analog converter DAC2 may be coupled to the second data line DL2b through a buffer BUF2. As will be described later, when the buffer unit BFU is omitted, the output terminal of the second digital-to-analog converter DAC2 may be directly coupled to the second data line DL2b.

Input terminals of the multiplexer MUX may be coupled to the first node N1, the first grayscale voltage generator 15, and the second grayscale voltage generator 16.

Each of the digital-to-analog converters DAC1, DAC2, and DAC3 may apply, to a corresponding data line, a first grayscale voltage or a second grayscale voltage corresponding to a grayscale value stored in a corresponding holding latch. However, when a first node voltage (e.g., from the first node N1) is provided by the multiplexer MUX to the second digital-to-analog converter DAC2, the second digital-to-analog converter DAC2 may output the first node voltage, regardless of the grayscale value stored in the holding latch.

The buffer unit BFU may include a plurality of buffers (e.g., BUF1, BUF2, and BUF3). For example, buffers BUF1 to BUF3 may be implemented in the form of an amplifier. The buffers BUF1 to BUF3 may generate data signals corresponding to the grayscale voltages supplied from the digital-to-analog converters DAC1 to DAC3, and supply the generated data signals to the data lines DL1a to DL3c. When the gain of the buffers BUF1 to BUF3 is 1, voltage magnitudes of the grayscale voltages and the data signals may be substantially unaltered by the buffer. Depending on the display panel DP, the buffer unit BFU may be excluded from the data driver 12. The digital-to-analog converting unit DAU may be directly coupled to the data lines DL1a to DL3c.

The first data lines DL1a, DL1b, and DL1c may be coupled to first pixels PX1ak, PX1bk, and PX1ck located in the fingerprint non-sensing area NFA. Second data lines DL2a, DL2b, and DL2c may be coupled to second pixels PX2ak, PX2bk, and PX2ck located in the fingerprint sensing area FA. Third data lines DL3a, DL3b, and DL3c may be coupled to third pixels PX3ak, PX3bk, and PX3ck located in the fingerprint non-sensing area NFA.

The first pixels PX1ak, PX1bk, and PX1ck, the second pixels PX2ak, PX2bk, and PX2ck, and the third pixels PX3ak, PX3bk, and PX3ck may be coupled to the same kth scan line SLk. For example, the gate electrode of the switching transistor M2 of each of the pixels PX1ak to PX3ck may be coupled to the kth scan line SLk (see FIG. 4). Here, k may be an integer of 1 or more.

Figure 11:
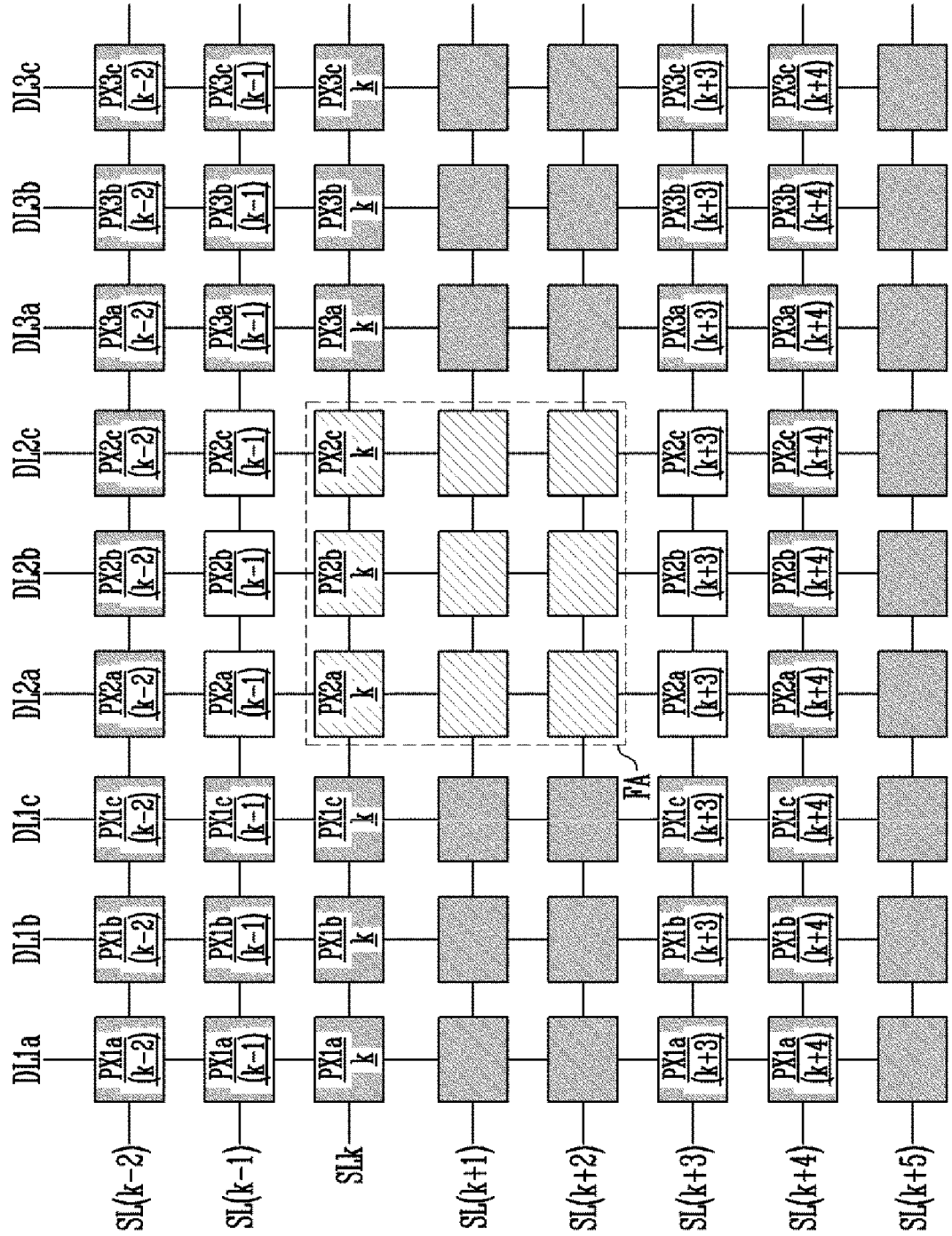
FIG. 11 is a diagram illustrating a fingerprint sensing area and luminance therearound according to an embodiment of the present disclosure.

FIG. 11 is a diagram illustrating a fingerprint sensing area and luminance according to an embodiment of the present disclosure. When FIG. 11 is described, FIG. 10 is further referred.

In FIG. 11, the area other than the fingerprint sensing area FA is referred to as a fingerprint non-sensing area. Pixels PX2ak, PX2bk, and PX3ck located in the fingerprint sensing area FA may emit irradiation light with a high luminance, based on second grayscale voltages during a fingerprint sensing period. The fingerprint sensing period may correspond to a plurality of image frame periods.

The multiplexer MUX may provide first grayscale voltages to the second digital-to-analog converter DAC2 during a first period. Therefore, during the first period, second data signals based on the first grayscale voltages may be applied to the second data lines DL2a, DL2b, and DL2c. During the first period, first data signals and third data signals based on the first grayscale voltages may be applied to the first data lines DL1a, DL1b, and DL1c and the third data lines DL3a, DL3b, and DL3c.

In the first period, when a turn-on level scan signal is supplied to a scan line SL(k−2), data signals corresponding to the first grayscale voltages may be written in pixels PX1a(k−2) to PX3c(k−2) coupled to the scan line SL(k−2). The pixels PX1a(k−2) to PX3c(k−2) may emit light, corresponding to the first grayscale voltages, during an emission period.

Next, the multiplexer MUX may provide a first node voltage to the second digital-to-analog converter DAC2 during a second period after the first period. Therefore, during the second period, the second data signals based on the first node voltage may be applied to the second data lines DL2a, DL2b, and DL2c. During the second period, the first data signals and the third data signals based on the first grayscale voltages may be applied to the first data lines DL1a, DL1b, and DL1c and the third data lines DL3a, DL3b, and DL3c.

In the second period, when a turn-on level scan signal is supplied to a scan line SL(k−1), data signals corresponding to the first grayscale voltages may be written in first pixels PX1a(k−1) to PX1c(k−1) and third pixels PX3a(k−1) to PX3c(k−1), which are coupled to the scan line SL(k−1). The first pixels PX1a(k−1) to PX1c(k−1) and the third pixels PX3a(k−1) to PX3c(k−1) may emit light corresponding to the first grayscale voltages during the emission period.

Meanwhile, in the second period, data signals corresponding to the first node voltage may be written in second pixels PX2a(k−2) to PX2c(k−2) coupled to the scan line SL(k−1). Referring back to FIGS. 4, 7, and 9, the first node voltage corresponds to the lowest voltage from among grayscale voltages to be generated, and the driving transistor M1 is implemented with a P-type transistor. Therefore, the second pixels PX2a(k−2) to PX2c(k−2) may emit light with a white grayscale value (e.g., a brightest grayscale value) during the emission period. In another embodiment, when the pixel circuit shown in FIG. 4 is implemented with an N-type transistor, the second pixels PX2a(k−2) to PX2c(k−2) may emit light with a black grayscale value (darkest grayscale value) during the emission period.

Next, the multiplexer MUX may provide second grayscale voltages to the second digital-to-analog converter DAC2 during a third period after the second period. During the third period, the second data signals based on the second grayscale voltages may be applied to the second data lines DL2a, DL2b, and DL2c. During the second period, the first data signals and the third data signals based on the first grayscale voltages may be applied to the first data lines DL1a, DL1b, and DL1c and the third data lines DL3a, DL3b, and DL3c.

In the third period, when a turn-on level scan signal is supplied to a scan line SLk, data signals corresponding to the first grayscale voltages may be written in first pixels PX1ak to PX1ck and third pixels PX3ak to PX3ck, which are coupled to the scan line SLk. The first pixels PX1ak to PX1ck and the third pixels PX3ak to PX3ck may emit light corresponding to the first grayscale voltages during the emission period.

Meanwhile, in the third period, data signals corresponding to the second grayscale voltages may be written in second pixels PX2ak to PX2ck coupled to the scan line SLk. The second pixels PX2ak to PX2ck may emit light corresponding to the second grayscale voltages during the emission period.

The first period, the second period, and the third period may be included in one image frame period.

Next, the multiplexer MUX may provide the first node voltage to the second digital-to-analog converter DAC2 during a fourth period after the third period. Therefore, during the fourth period, the second data signals based on the first node voltage may be applied to the second data lines DL2a, DL2b, and DL2c. During the fourth period, the first data signals and the third data signals based on the first grayscale voltages may be applied to the first data lines DL1a, DL1b, and DL1c and the third data lines DL3a, DL3b, and DL3c.

In the fourth period, when a turn-on level scan signal is supplied to a scan line SL(k+3), data signals corresponding to the first grayscale voltages may be written in first pixels PX1a(k+3) to PX1c(k+3) and third pixels PX3a(k+3) to PX3c(k+3), which are coupled to the scan line SL(k+3). The first pixels PX1a(k+3) to PX1c(k+3) and the third pixels PX3a(k+3) to PX3c(k+3) may emit light corresponding to the first grayscale voltages during the emission period.

Meanwhile, in the fourth period, data signals corresponding to the first node voltage may be written in second pixels PX2a(k+3) to PX2c(k+3) coupled to the scan line SL(k+3). As described above, the second pixels PX2a(k+3) to PX2c(k+3) may emit light with a white grayscale value (or a black grayscale value) during the emission period.

Next, the multiplexer MUX may provide the first grayscale voltages to the second digital-to-analog converter DAC2 during a fifth period after the fourth period. During the fifth period, second data signals based on the first grayscale voltages may be applied to the second data lines DL2a, DL2b, and DL2c. During the fifth period, the first data signals and the third data signals based on the first grayscale voltages may be applied to the first data lines DL1a, DL1b, and DL1c and the third data lines DL3a, DL3b, and DL3c.

In the fifth period, when a turn-on level scan signal is supplied to a scan line SL(k+4), data signals corresponding to the first grayscale voltages may be written in pixels PX1a(k+4) to PX3c(k+4) coupled to the scan line SL(k+4).

The pixels PX1a(k+4) to PX3c(k+4) may emit light corresponding to the first grayscale voltages during the emission period.

The first period, the second period, the third period, the fourth period, and the fifth period may be included in one frame period.

According to this embodiment, data signals corresponding to the second grayscale voltages are supplied to the second pixels PX2ak, PX2bk, and PX2ck, located in the fingerprint sensing area FA during one image frame, so that the second pixels PX2ak, PX2bk, and PX2ck can emit irradiation light with a high luminance, thereby enabling fingerprint sensing. Meanwhile, other pixels located in the fingerprint non-sensing area are driven corresponding to the first grayscale voltages during the same image frame, and thus the display quality of the image frame can be maintained.

When the second data lines DL2a, DL2b, and DL2c are changed from the state in which they are coupled to the first grayscale voltage generator 15 to the state in which they are coupled to the second grayscale voltage generator 16, it is necessary to secure a time necessary for the change in state and a time for voltage stabilization of the second data lines DL2a, DL2b, and DL2c. When such a spare time is not secured, erroneous data signals may be written in the second pixels PX2a(k−1), PX2b(k−1), PX2c(k−1), PX2ak, PX2bk, and PX2ck, and display failure may occur.

In this embodiment, when the second data lines DL2a, DL2b, and DL2c are changed from the state in which they are coupled to the first grayscale voltage generator 15 to the state in which they are coupled to the second grayscale voltage generator 16, the first node voltage is supplied to the second data lines DL2a, DL2b, and DL2c through the multiplexer MUX, so that the display failure can be prevented. The second pixels PX2a(k−1), PX2b(k−1), and PX2c(k−1) may emit light with a strong white grayscale value, and therefore, the emitted light may be used as irradiation light for fingerprint sensing.

Although a single color edge (white or black) that couples the second pixels PX2a(k−1), PX2b(k−1), and PX2c(k−1) may be viewed by a user, data signals corresponding to a white grayscale value (or a black grayscale value) are supplied to the pixels in the fingerprint non-sensing area surrounding the fingerprint sensing area FA, so that a natural edge can be viewed by the user.

In addition, because the first node voltage is a stable basic voltage as described above, the first node voltage can rapidly stabilize the voltage of the second data lines DL2a, DL2b, and DL2c, and thus the time necessary for voltage stabilization may be reduced. That is, when the first node voltage is used, the thickness of the displayed single color edge can be further decreased, and pixels in the fingerprint non-sensing area, which can display an image frame, can be further ensured.

The above description may be applied (e.g., identically applied) to cases where the second data lines DL2a, DL2b, and DL2c are changed from the state in which they are coupled to the second grayscale voltage generator 16 to the state in which they are coupled to the first grayscale voltage generator 15, and therefore, overlapping or duplicate descriptions may be omitted.

Figure 12:
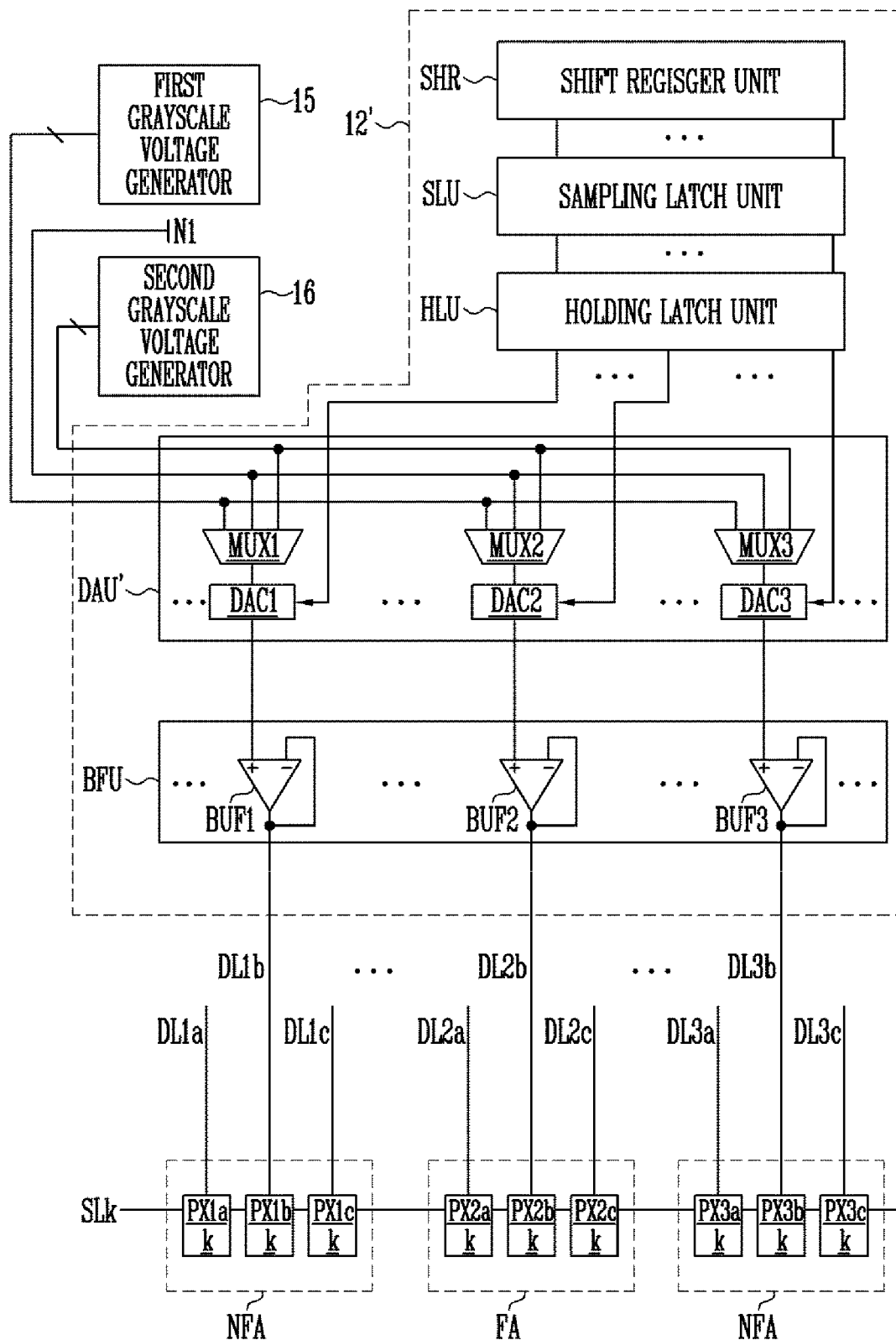
FIG. 12 is a diagram illustrating a data driver according to another embodiment of the present disclosure.

FIG. 12 is a diagram illustrating a data driver according to another embodiment of the present disclosure.

Referring to FIG. 12, the data driver 12' includes a modified digital-to-analog converting unit DAU', as compared with the data driver 12 shown in FIG. 10. Descriptions of components overlapping with those shown in FIG. 12 may be omitted.

The data driver 12' may apply, to a first data line DL1b, a first data signal generated based on one of a first node voltage, first grayscale voltages, and second grayscale voltages, and apply, to a second data line DL2b, a second data signal generated based on one of the first node voltage, the first grayscale voltages, and the second grayscale voltages.

The digital-to-analog converting unit DAU' may include multiplexers MUX1, MUX2, MUX3, . . . and digital-to-analog converters DAC1, DAC2, DAC3, In this embodiment, a number of multiplexers MUX1 to MUX3 may correspond to that of digital-to-analog converters DAC1 to DAC3. For example, the number of the multiplexers MUX1 to MUX3 may be equal to that of the digital-to-analog converters DAC1 to DAC3.

Input terminals of a first multiplexer MUX1 may be coupled to the first node the first grayscale voltage generator 15, and the second grayscale voltage generator 16.

An input terminal of a first digital-to-analog converter DAC1 may be coupled to an output terminal of the first multiplexer MUX1, and an output terminal of the first digital-to-analog converter DAC1 may be coupled to the first data line DL1b.

Input terminal of a second multiplexer MUX2 may be coupled to the first node N1, the first grayscale voltage generator 15, and the second grayscale voltage generator 16.

An input terminal of a second digital-to-analog converter DAC2 may be coupled to an output terminal of the second multiplexer MUX2, and an output terminal of the second digital-to-analog converter DAC2 may be coupled to the second data line DL2b.

In the display device according to the present disclosure, display of the fingerprint non-sensing area can be normally maintained even when the pixels located in the fingerprint sensing area locally emit light with a high luminance.

Example embodiments have been disclosed herein, and although specific terms are employed, they are used and are to be interpreted in a generic and descriptive sense only and not for the purpose of limitation. In some instances, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims and their equivalents.

What is claimed is:

1. A display device comprising:
   a first pixel coupled to a first data line, the first pixel being located in a fingerprint non-sensing area in a display area;
   a second pixel coupled to a second data line, the second pixel being located in a fingerprint sensing area in the display area;
   a first node to receive a first node voltage;
   a first grayscale voltage generator configured to generate first grayscale voltages;
   a second grayscale voltage generator configured to generate second grayscale voltages; and
   a data driver configured to apply, to the first data line, a first data signal generated based on one of the first node voltage, the first grayscale voltages, and the second grayscale voltages, and to apply, to the second data line, a second data signal generated based on one of the first node voltage, the first grayscale voltages, and the second grayscale voltages, wherein the data driver comprises a digital-to-analog converting unit comprising:
- a first multiplexer having input terminals coupled to the first node, the first grayscale voltage generator, and the second grayscale voltage generator;
- a first digital-to-analog converter having an input terminal coupled to an output terminal of the first multiplexer and an output terminal coupled to the first data line;
- a second multiplexer having input terminals coupled to the first node, the first grayscale voltage generator, and the second grayscale voltage generator; and
- a second digital-to-analog converter having an input terminal coupled to an output terminal of the second multiplexer and an output terminal coupled to the second data line.

2. The display device of claim 1, wherein the first grayscale voltage generator is configured to generate the first grayscale voltages by dividing a difference between a first high voltage applied to a first high voltage terminal and a first low voltage applied to a first low voltage terminal, and the second grayscale voltage generator is configured to generate the second grayscale voltages by dividing a difference between a second high voltage applied to a second high voltage terminal and a second low voltage applied to a second low voltage terminal.

3. The display device of claim 2, wherein the first node is coupled to the first low voltage terminal.

4. The display device of claim 3, wherein the first node is further coupled to the second low voltage terminal.

5. The display device of claim 4, wherein the second multiplexer is configured to:
- provide the first grayscale voltages to the second digital-to-analog converter during a first period;
- provide the first node voltage to the second digital-to-analog converter during a second period after the first period; and
- provide the second grayscale voltages to the second digital-to-analog converter during a third period after the second period, wherein the first period, the second period, and the third period are part of an image frame period.

6. The display device of claim 5, wherein the second multiplexer is further configured to:
- provide the first node voltage to the second digital-to-analog converter during a fourth period after the third period; and
- provide the first grayscale voltages to the second digital-to-analog converter during a fifth period after the fourth period, wherein the first period, the second period, the third period, the fourth period, and the fifth period are included in one image frame period.

* * * * *